(12) United States Patent
Song

(10) Patent No.: US 7,828,397 B2
(45) Date of Patent: Nov. 9, 2010

(54) TENSION MEMBER STRUCTURE OF CRAWLER

(75) Inventor: In-Hyuk Song, Daejeon (KR)

(73) Assignee: Camoplast Korea Ltd., Daejeon (KR)

( * ) Notice: Subject to any disclaimer, the term of this patent is extended or adjusted under 35 U.S.C. 154(b) by 107 days.

(21) Appl. No.: 11/884,335

(22) PCT Filed: Sep. 26, 2005

(86) PCT No.: PCT/KR2005/003190

§ 371 (c)(1),
(2), (4) Date: Apr. 30, 2008

(87) PCT Pub. No.: WO2006/090961

PCT Pub. Date: Aug. 31, 2006

(65) Prior Publication Data

US 2009/0045673 A1 Feb. 19, 2009

(30) Foreign Application Priority Data

Feb. 25, 2005 (KR) .................. 10-2005-0015998

(51) Int. Cl.
*B62D 55/24* (2006.01)
(52) U.S. Cl. .................. 305/170; 305/165; 305/178
(58) Field of Classification Search .................. 305/157, 305/165, 166, 167, 168, 169, 170, 171, 172, 305/173, 174, 175, 176, 177, 178, 179, 180, 305/181; 474/205, 259, 260
See application file for complete search history.

(56) References Cited

U.S. PATENT DOCUMENTS

| | | | | |
|---|---|---|---|---|
| 2,182,169 A | * | 12/1939 | Bierer | .................. 474/254 |
| 3,724,645 A | * | 4/1973 | Spaar | .................. 198/847 |
| 3,900,231 A | * | 8/1975 | Ohm | .................. 305/178 |
| 4,351,432 A | * | 9/1982 | Ballocci et al. | .................. 198/847 |
| 5,427,443 A | * | 6/1995 | Muramatsu et al. | .................. 305/166 |
| 6,523,915 B1 | | 2/2003 | Matsuo | |
| 6,843,539 B2 | * | 1/2005 | Tsuru | .................. 305/170 |

(Continued)

FOREIGN PATENT DOCUMENTS

DE 3435486 A1 * 4/1985

(Continued)

OTHER PUBLICATIONS

International Search Report for International Application No. PCT/KR2005/003190 dated Dec. 21, 2005.

*Primary Examiner*—Russell D Stormer
(74) *Attorney, Agent, or Firm*—Jenkins, Wilson, Taylor & Hunt, P.A.

(57) ABSTRACT

The present invention relates to a crawler used for transporting continuous-track vehicles for construction, civil engineering, agricultural use or the like. More particularly this invention relates to a structure of a tension member of the crawler, in which a plurality of tension members concentrically wound are juxtaposedly inserted in the transverse direction of the crawler, and therefore the tension member is prevented from being delaminated and the durability and the workability and productivity can be more improved. The present invention is characterized in that each of the tension members is concentrically wound several times, and the wound members are arranged juxtaposedly in the transverse direction of the crawler, thereby forming the tension members in the form of plural layers.

6 Claims, 4 Drawing Sheets

U.S. PATENT DOCUMENTS

| | | | |
|---|---|---|---|
| 6,918,639 B2 * | 7/2005 | Kondo | 305/167 |
| 7,438,778 B2 * | 10/2008 | Tsuru | 156/159 |
| 2003/0107267 A1 * | 6/2003 | Katoh et al. | 305/171 |
| 2004/0026217 A1 * | 2/2004 | Kondo | 198/804 |
| 2008/0272648 A1 * | 11/2008 | Kondo et al. | 305/174 |

FOREIGN PATENT DOCUMENTS

| | | |
|---|---|---|
| EP | 1116644 | 7/2001 |
| JP | 57012143 A * | 1/1982 |
| JP | 62178477 A * | 8/1987 |
| JP | 04143180 A * | 5/1992 |
| JP | 04283180 A * | 10/1992 |
| JP | 05272593 A * | 10/1993 |
| JP | 06144310 A * | 5/1994 |
| JP | 2002321668 | 11/2002 |
| KR | 2003013531 | 2/2003 |

* cited by examiner

[Fig. 1]
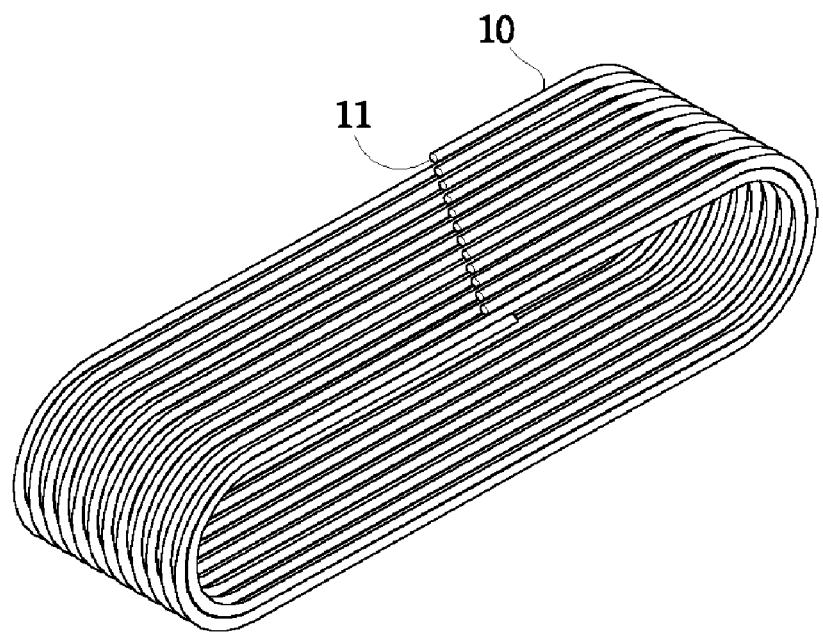
[Fig. 2]
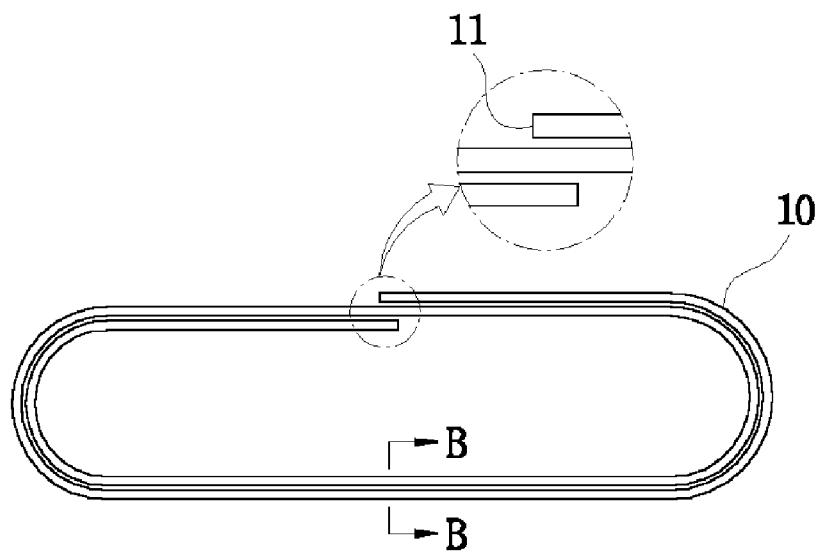
[Fig. 3]
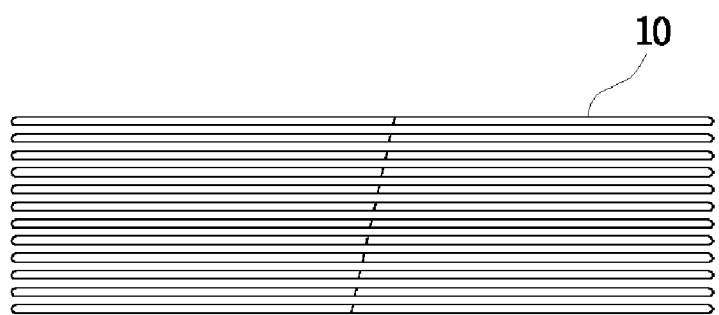

[Fig. 4]
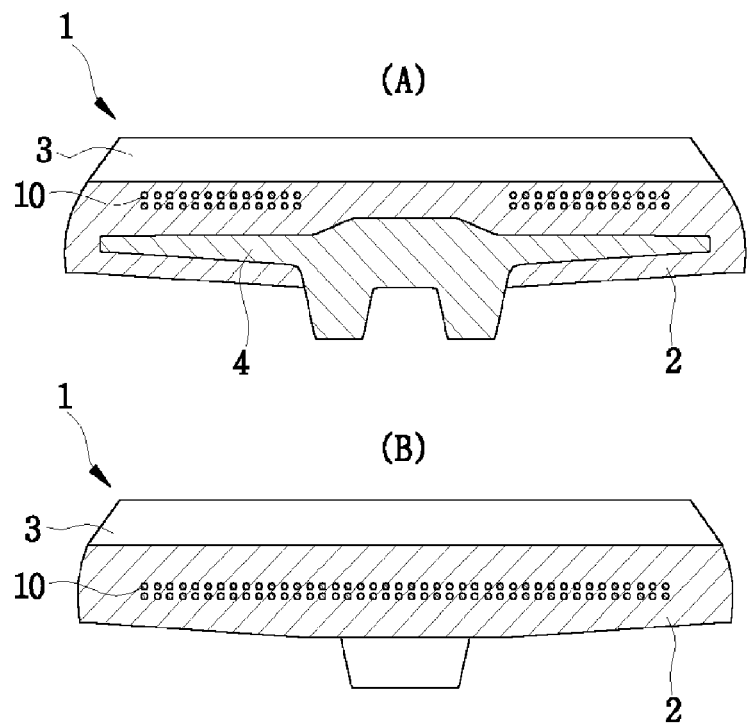
[Fig. 5]
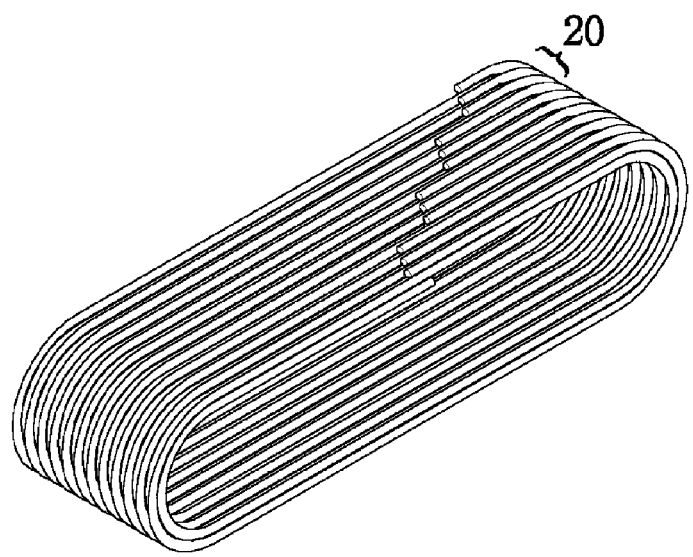
[Fig. 6]
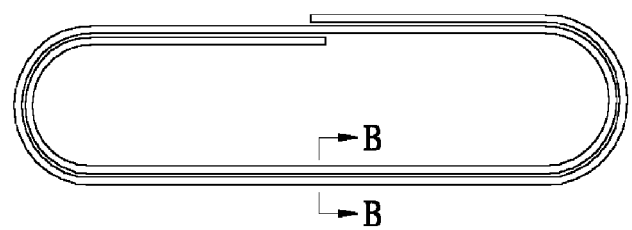

[Fig. 7]
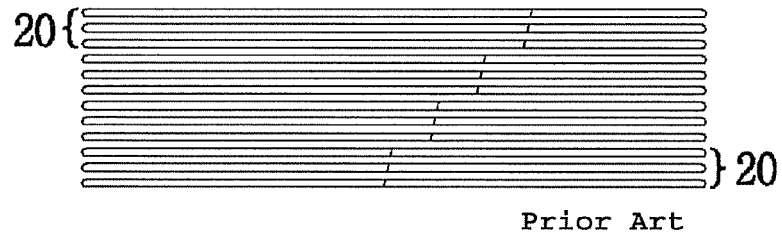
Prior Art
[Fig. 8]
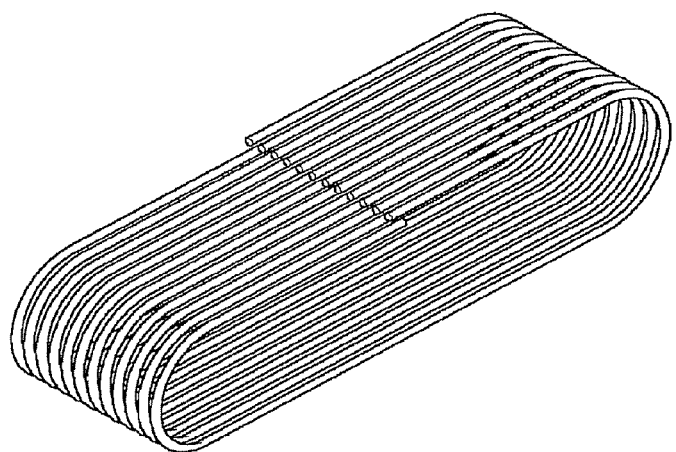
Prior Art
[Fig. 9]
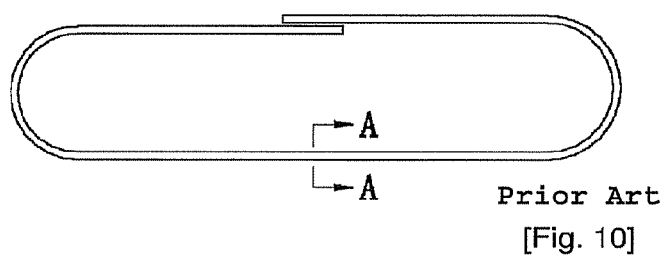
Prior Art
[Fig. 10]
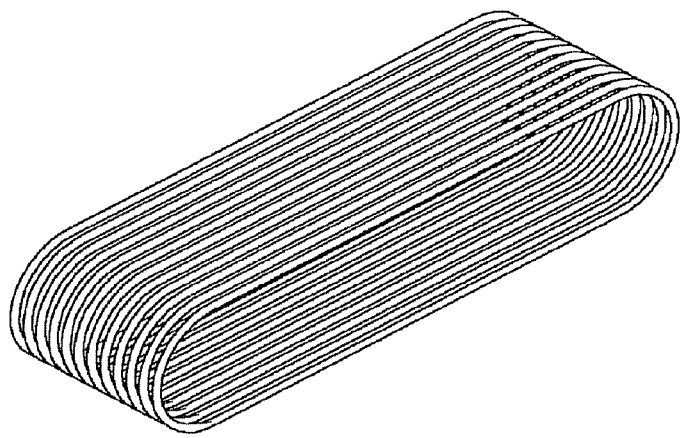

Prior Art
[Fig. 11]
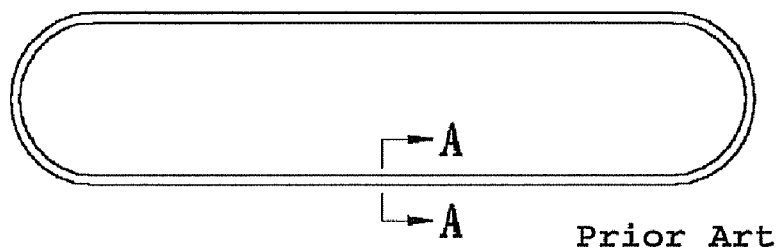
Prior Art
[Fig. 12]
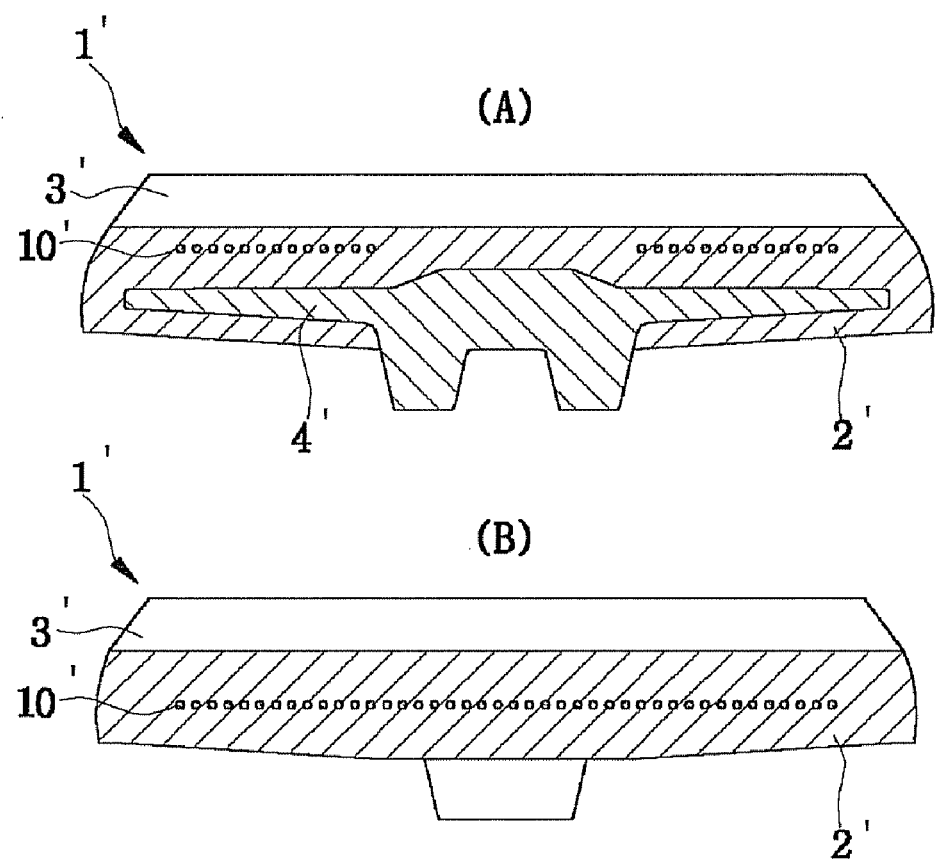

TENSION MEMBER STRUCTURE OF CRAWLER

TECHNICAL FIELD

The present invention relates to a crawler used for transporting continuous-track vehicles for construction, civil engineering, agricultural use or the like. More particularly this invention relates to a structure of a tension member of the crawler, in which a plurality of tension members concentrically wound are juxtaposedly inserted in the traversing direction, and therefore the tension member is prevented from being delaminated, and the durability and the workability and productivity can be more improved.

BACKGROUND ART

Since most conventional crawlers used for transporting continuous-track vehicles are made from rubber material, a tension member, such as steel cords, Kevlar, etc., is inserted in the crawler body, so that it has stiffness and tensile strength sufficient not to be broken even during long time use.

The conventional method of inserting the tension member to the crawler includes an overlap method and an endless method.

According to the overlap method, regarding to FIG. 8 and FIG. 9, a plurality of tension members 10' are arrayed in the direction of traversing the crawler at regular intervals with both ends thereof overlapped and adhered to each other, so that the tension members 10' are supported by the adhering force. For the latter endless method, referring to FIG. 10 and FIG. 11, a single piece of the tension member 10' is continuously wound in the direction of traversing the crawler without any severance or junction point.

As shown in FIG. 12, the crawler 1' made by means of the overlap method and the endless method commonly forms a structure of the tension members inserted in the crawler body 2' so that they form a single layer that the tension members are juxtaposed horizontally at regular intervals.

In FIG. 12, (A) shows a crawler in which a steel core 4' is provided and (B) shows a crawler without a steel core.

The overlap method has an advantage that the manufacturing process is quite simple, but has disadvantages that, if the crawler is overloaded by the excessive external force, the adhered overlap portion may be broken and so the broken tension members may protrude outside, thereby the crawler being delaminated and cut. This deteriorates the durability of the crawler product.

To the contrary, the endless method has an advantage that the tension members are not easily broken or delaminated, since the method utilizes a single piece of tension member having no severed or junction point. However, it has disadvantages that manufacturing process is quite complicated and difficult, thereby increasing the costs and lowering the productivity.

DISCLOSURE OF INVENTION

Technical Problem

Therefore, the present invention has been made to solve the above-mentioned problems involved in the conventional overlap type and the endless type tension members, and it is an object of the present invention to provide a structure of tension members, which is partially similar to the overlap type in configuration, but adopts the excellent adhering capability of the endless type. That is, the present invention combines the advantages of the overlap type and the endless type, and thereby the durability and the workability and productivity can be more improved.

Technical Solution

To achieve the above object, according to the present invention, there is provided a tension member structure of a crawler, including a plurality of tension members concentrically wound several times and arranged juxtaposedly in the traversing direction of the crawler body, thereby forming the tension members in the form of plural layers.

The object of the present invention is accomplished by arranging a plurality of tension members at regular intervals in the transverse direction of the crawler in such a manner that each of the tension members which is wound about more than two times the length of the circumference of the crawler, thereby providing the adhering area over the total length of the crawler while forming the tension members in the form of plural layers.

In addition, a plurality of tension member division groups, each of which includes a given number of tension members and divides the width of the crawler into equal parts, are transversely arranged on the group basis. Here also, the plurality of tension members are arranged in the transverse direction of the crawler in such a manner that each of the tension members is wound about more than two times the length of the circumference of the crawler, thereby providing the adhering area between the tension members over the total length of the crawler while forming the tension members in the form of plural layers. Considering the anti-breakage against the external force, the respective tension member division groups are arranged in parallel with one another, so that their cutting edges are located at different points.

ADVANTAGEOUS EFFECTS

According to the present invention, since the respective tension member to be juxtaposedly inserted inside the crawler body is concentrically wound several times, thereby providing the entire adhering area between the tension members over the total length of the crawler while forming the tension members in the form of plural layers. Accordingly, the crawler can be effectively prevented from getting broken or delaminated because of overload from the external forces or due to long time use, and so the lifetime of the product can be remarkably extended.

Further, since the manufacturing process becomes quite simpler and easier comparing to the conventional endless type, the manufacturing cost and manpower can be economized and the productivity can be improved.

BRIEF DESCRIPTION OF THE DRAWINGS

The above and other objects, features, and advantages of the present invention will become more apparent from the following description when taken in conjunction with the accompanying drawings, in which:

FIG. 1 is a perspective view showing a tension member according to one embodiment of the present invention, FIG. 2 is a front view showing the tension member according to the embodiment of the present invention shown in FIG. 1, FIG. 3 is a top view showing the tension member according to the embodiment of the present invention shown in FIG. 1, FIG. 4 is a B-B sectional view of either of FIG. 2 or FIG. 6, showing that the tension members are inserted in a crawler, FIG. 5 is a perspective view showing a tension member according to another embodiment of the present invention, FIG. 6 is a front view showing the tension member according to another the embodiment of the present invention shown in FIG. 5, FIG. 7 is a top view showing the tension member according to another the embodiment of the present invention shown in FIG. 5, FIG. 8 is a perspective view showing a conventional overlap type tension member, FIG. 9 is a front view showing a conventional overlap type tension member, FIG. 10 is a perspective view showing a conventional endless type tension member, FIG. 11 is a front view showing a conventional endless type tension member, and FIG. 12 is an A-A sectional view of FIG. 9 and FIG. 11, showing that the tension members are inserted in a crawler.

BRIEF DESCRIPTION OF REFERENCE NUMBER

1: crawler 2: crawler body
10: tension member 20: tension member division group

BEST MODE FOR CARRYING OUT THE INVENTION

Hereinafter, preferred embodiments to effectively achieve the object of the present invention will be described in detail with reference to the attached drawings.

The primary feature of the present invention is that the respective tension members 10, each of which is concentrically wound several times unlike the overlap type of which the both ends of a plurality of the tension members are adhered to each other, are inserted in a crawler body 2, and therefore the present invention provides both the excellent workability and productivity corresponding to the advantages of the overlap type, and the steady durability and adhering capability corresponding to the advantages of the endless type.

From now on, more detailed explanation for helping easier implementation of the features of the present invention will follow.

With reference to FIGS. 1-4, a plurality of tension members 10 are arranged juxtaposedly in the transverse direction of the crawler 1 at regular intervals.

Each of the tension member 10 is concentrically wound several times, so that the wound members 10 form an horizontally arranged configuration inside the crawler body 2.

That is to say, as shown in FIG. 2, by winding each tension member 10 about more than two times the length of the circumference of the conventional crawler 1, the entire adhering area between the tension members 10 is formed over the total length of the crawler 1, thereby effectively preventing the crawler 1 from being broken or delaminated because of overload from the external forces.

Furthermore, such configured tension members 10 result in plural-layered structure as shown in FIG. 4, and so the present invention provides much better stiffness and tensile strength comparing to the overlap type. Therefore, the lifetime of the end product can be remarkably extended. In addition, comparing to the conventional endless type, the manufacturing process becomes simpler and so the productivity can be improved.

Here, FIG. 4 (A) shows a crawler in which a steel core 4 is provided and FIG. 4 (B) shows a crawler without a steel core.

In the case of (A), since the sprocket holes must be formed at the center portion, the tension members 10 are not disposed there, while in the case of (B), the tension members 10 are disposed throughout the width of the crawler body.

In order to allow the crawler 1 to have smooth flexibility, both ends of the tension members 10 which are concentrically wound several times may be overlapped to a some degree as shown in FIG. 2, or may correctly stand in line.

Meanwhile, with reference to FIG. 2, the end portions of the respective tension members 10 form cutting edges 11 cut at right angles. In addition, with regard to FIG. 3, the tension members 10 are desirably arranged juxtaposedly so that the cutting edges 11 stand in an oblique row at a given angle with respect to the transverse direction of the crawler 1.

Since the greater oblique angle of the cutting edges 11 lessens the influence of external force applied to the tension members 10, the crawler body 2 can be protected from being broken.

However, the above specific configuration that the cutting edges 11 are disposed slantingly does not limit the scope of the present invention, since the configuration is introduced only as one preferred embodiment of the present invention. Therefore, in the present invention, the tension members 10 are arrayed so that the cutting edges 11 stand in parallel with respect to the transverse direction of the crawler 1.

In the drawings, the unexplained numeral "3" denotes a plurality of rugs formed on the outward surface of the crawler body 2.

In the meantime, referring to FIGS. 5-8 illustrating another embodiment, a plurality of tension member division groups 20, each of which includes a given number of tension members 10 and divides the width of the crawler 1 into equal parts, are transversely arranged juxtaposedly on the group basis.

That is, each tension member division group 20 is collectively arranged juxtaposedly in the transverse direction of the crawler 1, but the tension members 10 are not discretely juxtaposed. Also, the respective tension member division groups 20 are arranged juxtaposedly, so that their cutting edges are located at different points as shown in FIG. 7, in order to keep the stiffness that allows the crawler body not to be broken by the external forces.

In addition, within each of the tension member division group 20, the cutting edges of the members may be slantingly or evenly disposed, just as in the case of the aforementioned tension members 10.

From the foregoing, since the tension member structure according to the present invention adopts only the advantages of both the overlap type and the endless type, both the durability and the workability and productivity can be more improved.

The invention claimed is:

1. A tension member structure of a crawler, comprising a plurality of tension members (10) arranged juxtaposedly in the transverse direction of the crawler body (2), each of the tension members being concentrically wound several times thereby forming the tension members (10) in the form of plural layers:

wherein the plurality of tension members (10) comprises a plurality of tension member division groups (20), each of which comprises predetermined numbers of a tension member (10) and divides the width of the crawler (1) into equal parts, and are transversely arranged juxtaposedly on the group basis; and wherein the tension member division groups (20) are arranged juxtaposedly so that their end edges are located at different points, to improve the anti-breakage against the external force.

2. The tension member structure according to claim 1, wherein the tension member (10) is concentrically wound about more than two times the length of the circumference of the crawler (1), thereby providing an adhering area between the tension members over the total length of the crawler.

3. The tension member structure according to claim 1, wherein both ends of the respective tension members (10) form cutting edges (11) cut at right angles, the tension members (10) being arranged juxtaposedly so that the cutting edges (11) stand in parallel with respect to the transverse direction of the crawler (1).

4. The tension member structure according to claim 1, wherein both ends of the tension members (10) concentrically wound are overlapped and adhered to each other.

5. The tension member structure according to claim 1, wherein both ends of the tension members (10) concentrically wound are aligned to be near each other.

6. A tension member structure of a crawler, comprising a plurality of tension members (10) arranged juxtaposedly in the transverse direction of the crawler body (2), each of the tension members being concentrically wound several times thereby forming the tension members (10) in the form of plural layers;

wherein both ends of the respective tension members (10) form cutting edges (11) cut at right angles, the tension members (10) being arranged juxtaposedly so that the cutting edges (11) stand in an oblique row at a predetermined angle with respect to the transverse direction of the crawler (1).

* * * * *